United States Patent
Asakura (10) Patent No.: US 11,733,566 B2
(45) Date of Patent: Aug. 22, 2023

(54) CURVED LIQUID CRYSTAL PANEL AND MANUFACTURING METHOD FOR CURVED LIQUID CRYSTAL PANEL

(71) Applicant: Shanghai Tianma Micro-Electronics Co., Ltd., Shanghai (CN)

(72) Inventor: Tetsuroh Asakura, Kanagawa (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 17/549,197

(22) Filed: Dec. 13, 2021

(65) Prior Publication Data

US 2022/0197068 A1    Jun. 23, 2022

(30) Foreign Application Priority Data

Dec. 18, 2020  (JP) ................................. 2020-209796

(51) Int. Cl.
*G02F 1/1339*  (2006.01)
*G02F 1/1333*  (2006.01)

(52) U.S. Cl.
CPC ...... *G02F 1/1339* (2013.01); *G02F 1/133305* (2013.01); *G02F 1/133308* (2013.01)

(58) Field of Classification Search
None
See application file for complete search history.

(56) References Cited

U.S. PATENT DOCUMENTS

| 2019/0204638 A1* | 7/2019 | Park | ................ G02F 1/1333 |
| 2021/0263370 A1* | 8/2021 | Maeng | ............ G02F 1/13452 |

FOREIGN PATENT DOCUMENTS

JP    2017-181821 A    10/2017

* cited by examiner

*Primary Examiner* — Phu Vu
(74) *Attorney, Agent, or Firm* — Sughrue Mion, PLLC (57) ABSTRACT

A curved liquid crystal panel includes a first substrate curved in a first direction; a second substrate curved in a first direction and facing the first substrate; a liquid crystal sandwiched between the first substrate and the second substrate; a first seal that adheres the first substrate and the second substrate to each other and that seals the liquid crystal; and a second seal surrounding a periphery of the first seal. A force of the second seal that adheres the first substrate and the second substrate to each other is weaker than a force of the first seal that adheres the first substrate and the second substrate to each other.

8 Claims, 5 Drawing Sheets

CURVED LIQUID CRYSTAL PANEL AND MANUFACTURING METHOD FOR CURVED LIQUID CRYSTAL PANEL

CROSS-REFERENCE TO RELATED APPLICATION

This application claims the benefit of Japanese Patent Application No. 2020-209796, filed on Dec. 18, 2020, the entire disclosure of which is incorporated by reference herein.

FIELD

The present disclosure relates generally to a curved liquid crystal panel and a manufacturing method for the curved liquid crystal panel.

BACKGROUND

There is a demand for display devices that have shapes that correspond to the installation location, the design of the device in which the display device is to be mounted, and the like. To answer this demand, liquid crystal display devices that have curved display surfaces have been developed. For example, Unexamined Japanese Patent Application Publication No. 2017-181821 discloses a vehicle-mounted device that includes a curved display, and a main body part for attaching the curved display to the vehicle.

The curved display of Unexamined Japanese Patent Application Publication No. 2017-181821 includes a first substrate curved in a first direction, a second substrate curved in the first direction and disposed facing the first substrate, and a seal material that adheres the first substrate and the second substrate to each other. The seal material includes a first seal extending in a second direction orthogonal to the first direction, and a second seal extending in the first direction. In Unexamined Japanese Patent Application Publication No. 2017-181821, a width in the first direction of the first seal is configured to be greater than a width in the second direction of the second seal, thereby suppressing the concentration of stress in the first substrate and the second substrate, and reducing light leakage that occurs near the four corners of the display surface.

In Unexamined Japanese Patent Application Publication No. 2017-181821, shear stress (twisting that is applied to the seal material due to the stacked first substrate and second substrate curving) continuously acts on the seal member. Accordingly, the seal material is more likely to deteriorate, and air bubbles may enter into the liquid crystal from outside the seal material.

SUMMARY

A curved liquid crystal panel according to a first aspect of the present disclosure includes:
a first substrate curved in a first direction;
a second substrate curved in the first direction and facing the first substrate;
a liquid crystal sandwiched between the first substrate and the second substrate;
a first seal that adheres the first substrate and the second substrate to each other, and that seals the liquid crystal; and
a second seal surrounding a periphery of the first seal: wherein a force of the second seal adhering the first substrate and the second substrate to each other is weaker than a force of the first seal adhering the first substrate and the second substrate to each other.

A manufacturing method for a curved liquid crystal panel according to a second aspect includes:
forming, on a first substrate or a second substrate, a first seal that seals a liquid crystal;
forming, on one of the first substrate and the second substrate on which the first seal is formed, a second seal surrounding a periphery of the first seal;
stacking one of the first substrate and the second substrate on which the first seal and the second seal are formed on another of the first substrate and the second substrate;
curing the second seal and adhering the first substrate and the second substrate to each other;
curving, in a first direction, the first substrate and the second substrate that are adhered to each other;
weakening a force of the second seal adhering the first substrate and the second substrate to each other in a state in which the first substrate and the second substrate are curved; and
curing the first seal in the state in which the first substrate and the second substrate are curved, wherein
the weakened force of the second seal adhering the first substrate and the second substrate to each other is weaker than a force of the cured first seal adhering the first substrate and the second substrate to each other.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which.

DETAILED DESCRIPTION

Hereinafter, a curved liquid crystal panel according to various embodiments is described while referencing the drawings.

Embodiment 1

Figure 1:
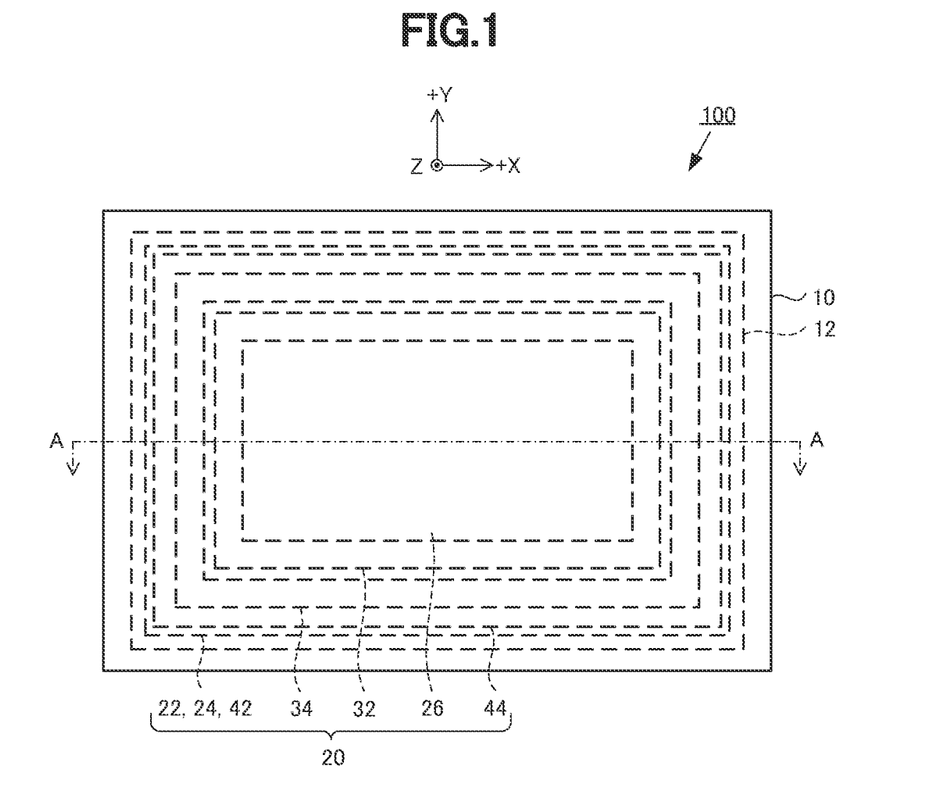
FIG. 1 is a plan view of a curved liquid crystal panel according to Embodiment 1.
Figure 2:
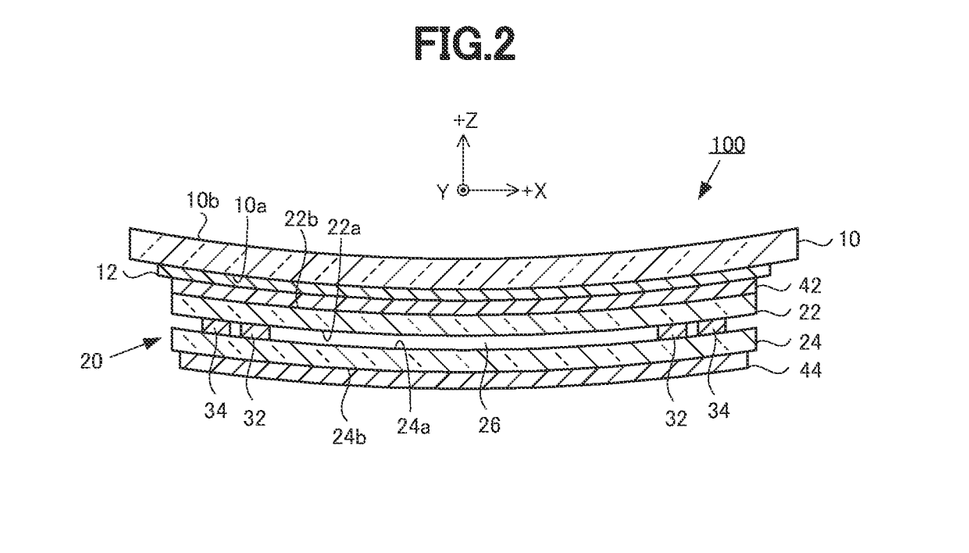
FIG. 2 is a cross-sectional view of the curved liquid crystal panel illustrated in FIG. 1, taken along line A-A.

A curved liquid crystal panel 100 according to the present embodiment is described while referencing FIGS. 1 to 7. As illustrated in FIGS. 1 and 2, the curved liquid crystal panel 100 includes a curved cover 10 and a liquid crystal panel 20. The curved cover 10 curves and supports the liquid crystal panel 20. The curved cover 10 and the liquid crystal panel 20 are adhered to each other by an adhesive layer 12. The liquid crystal panel 20 displays text, color images, and the like in accordance with signals from a non-illustrated display controller and a non-illustrated drive circuit. In the present specification, to facilitate comprehension, a description is given in which, in FIG. 1, the right direction (the right direction on paper) of the curved liquid crystal panel 100 is referred to as the "+X direction", the up direction (the up direction on paper) is referred to as the "+Y direction", and the direction perpendicular to the +X direction and the +Y direction (the front direction on paper) is referred to as the "+Z direction."

The curved liquid crystal panel 100 and a backlight disposed on the −Z side constitute the display device. The display device that includes the curved liquid crystal panel 100 is mounted in an electronic apparatus, a vehicle, or the like. Additionally, the display device that includes the curved liquid crystal panel 100 is used as a signage display.

The curved cover 10 of the curved liquid crystal panel 100 supports the liquid crystal panel 20 in a curved state via the adhesive layer 12. The curved cover 10 includes a first main surface 10a and a second main surface 10b that are curved in a first direction (the −Z direction in the present embodiment). The curvature radii of the first main surface 10a and the second main surface 10b are from 800 mm to 1200 mm, for example. The curved cover 10 is formed from glass, light transmitting resin, or the like.

The adhesive layer 12 of the curved liquid crystal panel 100 is provided on the first main surface 10a of the curved cover 10. The adhesive layer 12 adheres the liquid crystal panel 20 to the first main surface 10a of the curved cover 10. In one example, the adhesive layer 12 is implemented as an optical clear adhesive film (OCA).

In one example, the crystal panel 20 of the curved liquid crystal panel 100 is implemented as a transmissive liquid crystal panel that is driven by a thin film transistor (TFT). The liquid crystal panel 20 adheres the display surface (a first polarizing plate 42, described later) to the first main surface 10a of the curved cover 10, and is curved in the −Z direction.

As illustrated in FIGS. 1 and 2, the liquid crystal panel 20 includes a first substrate 22, a second substrate 24, a liquid crystal 26, a first seal 32, and a second seal 34. The liquid crystal panel 20 also includes a first polarizing plate 42 and a second polarizing plate 44. The first substrate 22 and the second substrate 24 sandwich the liquid crystal 26. The first seal 32 and the second seal 34 adhere the first substrate 22 and the second substrate 24 to each other. The first polarizing plate 42 is adhered to the first substrate 22 and the second polarizing plate 44 is adhered to the second substrate 24.

Note that, the hatching of the liquid crystal 26 is omitted in FIG. 2 to facilitate comprehension.

In one example, the first substrate 22 of the liquid crystal panel 20 is implemented as a glass substrate. The first substrate 22 is curved in the −Z direction. The first substrate 22 includes, on a surface 22a that, with a surface 24a of the second substrate 24, sandwiches the liquid crystal 26, a stripe-like color filter, a black matrix, electrodes, an alignment film, or the like (all not illustrated). Additionally, the first polarizing plate 42 is adhered to a surface 22b of a side opposite the surface 22a of the first substrate 22.

As with the first substrate 22, the second substrate 24 of the liquid crystal panel 20 is implemented as a glass substrate. The second substrate 24 is also curved in the −Z direction. The second substrate 24 includes, on a surface 24a that, with the surface 22a of the first substrate 22, sandwiches the liquid crystal 26, a TFT, a wiring, electrodes, an alignment film, or the like (all not illustrated). Additionally, the second polarizing plate 44 is adhered to a surface 24b of a side opposite the surface 24a of the second substrate 24. The first substrate 22 and the second substrate 24 are adhered to each other, at a predetermined spacing (cell gap), by the first seal 32 and the second seal 34.

As illustrated in FIG. 2, the liquid crystal 26 of the liquid crystal panel 20 is sandwiched between the first substrate 22 and the second substrate 24. The liquid crystal 26 is nematic liquid crystal, and the liquid crystal panel 20 operates in twisted nematic (TN) mode.

The first seal 32 of the liquid crystal panel 20 is provided between the first substrate 22 and the second substrate 24, and adheres the first substrate 22 and the second substrate 24 to each other. Additionally, the first seal 32 seals the liquid crystal 26, sandwiched between the first substrate 22 and the second substrate 24.

As illustrated in FIG. 1, the first seal 32 has a frame-like shape. The first seal 32 is formed along the external shapes of the first substrate 22 and the second substrate 24. In one example, the first seal 32 is formed from an ultraviolet (UV) curable adhesive. As described later, the first seal 32 is cured in a state in which the first substrate 22 and the second substrate 24 are curved. Accordingly, shear stress caused by the curving of the first substrate 22 and the second substrate 24 can be suppressed from acting on the first seal 32. Since shear stress that acts on the first seal 32 can be suppressed, deterioration of the first seal 32 can be suppressed. Furthermore, since deterioration of the first seal 32 can be suppressed, the entering of air bubbles from outside into the liquid crystal 26 due to weakening of the adhesive strength of the first seal 32 can be suppressed.

As with the first seal 32, the second seal 34 of the liquid crystal panel 20 adheres the first substrate 22 and the second substrate 24 to each other. The second seal 34 has a frame-like shape. The second seal 34 surrounds the periphery of the first seal 32. In one example, the second seal 34 is formed from a disassemblable adhesive. The disassemblable adhesive is an adhesive for which the adhesive strength weakens due to light irradiation, heat, and the like. Examples of the disassemblable adhesive include light melt adhesives, hot melt adhesives, and the like. Another example of the disassemblable adhesive is UV releasable type adhesive (COPONYL) (registered trademark), manufactured by Mitsubishi Chemical Corporation.

As described later, the second seal 34 is cured in a state in which the first substrate 22 and the second substrate 24 are flat. The second seal 34 maintains the adhered state of the first substrate 22 and the second substrate 24 until the first substrate 22 and the second substrate 24 are curved. Additionally, in the state in which the first substrate 22 and the second substrate 24 are curved, the force of the second seal 34 that adheres the first substrate 22 and the second substrate 24 to each other is weaker than the force of the first seal 32 that adheres the first substrate 22 and the second substrate 24 to each other. In the present embodiment, the force of the second seal 34 that adheres the first substrate and the second substrate to each other is, due to releasing, softening, liquefaction, breaking, and the like of the second seal 34, made weaker than the force of the first seal 32 that adheres the first substrate and the second substrate to each other. Hereinafter, the force adhering the first substrate and the second substrate to each other is referred to as an "adhering force."

The first polarizing plate 42 of the liquid crystal panel 20 is adhered to the surface 22b of the first substrate 22. Additionally, the first polarizing plate 42 is adhered to the first main surface 10a of the curved cover 10 via the adhesive layer 12. The second polarizing plate 44 of the liquid crystal panel 20 is adhered to the surface 24b of the second substrate 24.

Figure 3:
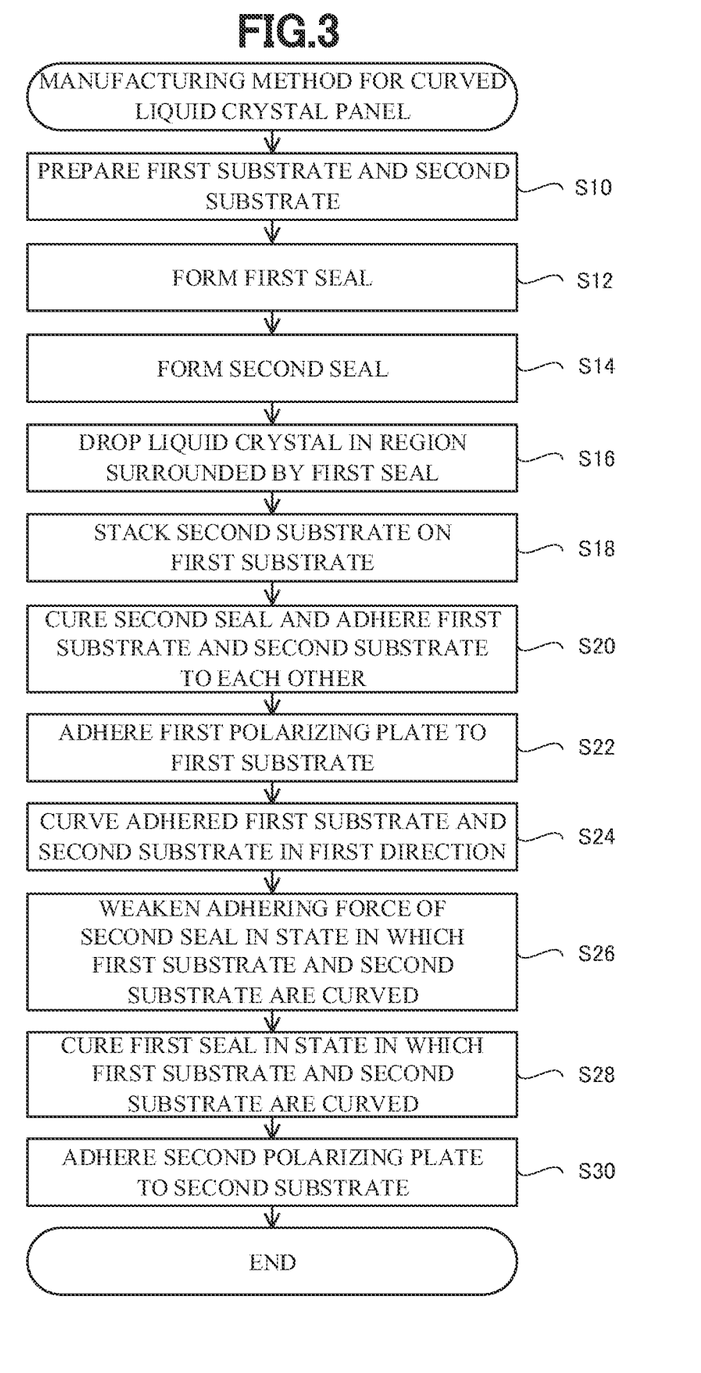
FIG. 3 is a flowchart illustrating a manufacturing method for the curved liquid crystal panel according to Embodiment 1.

Next, a manufacturing method for the curved liquid crystal panel 100 is described. FIG. 3 is a flowchart illustrating the manufacturing method of the curved liquid crystal panel 100. The manufacturing method for the curved liquid crystal panel 100 includes preparing the first substrate 22 and the second substrate 24 (step S10); forming, on one of the first substrate 22 and the second substrate 24, the first seal 32 that seals the liquid crystal 26 (step S12); forming, on the one of the first substrate 22 and the second substrate 24 on which the first seal 32 is formed, the second seal 34 that surrounds the periphery of the first seal 32 (step S14); dropping the liquid crystal 26 in a region surrounded by the first seal 32 (step S16); and stacking the one of the first substrate 22 and the second substrate 24, on which the first seal 32 and the second seal 34 are formed, on the other of the first substrate 22 and the second substrate 24 (step S18).

The manufacturing method for the curved liquid crystal panel 100 further includes curing the second seal 34 to adhere the first substrate 22 and the second substrate 24 to each other (step S20); adhering the first polarizing plate 42 to the first substrate 22 (step S22); curving, in the first direction (the –Z direction), the first substrate 22 and the second substrate 24 that are adhered to each other (step S24); weakening the force adhering the first substrate 22 and the second substrate 24 to each other of the cured second seal 34 in a state in which the first substrate 22 and the second substrate 24 are curved (step S26); curing the first seal 32 in the state in which the first substrate 22 and the second substrate 24 are curved (step S28); and adhering the second polarizing plate 44 to the second substrate 24 (step S30).

In step S10, a glass substrate on which a color filter, a black matrix, or the like is formed (a so-called color filter substrate) is prepared as the first substrate 22. Additionally, a glass substrate on which a TFT, a wiring, or the like is formed (a so-called TFT substrate) is prepared as the second substrate 24.

Figure 4:
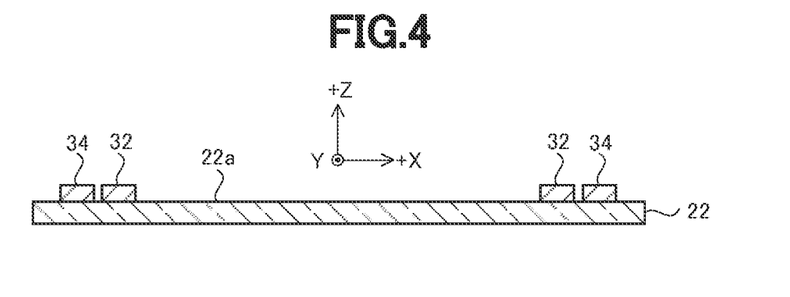
FIG. 4 is a schematic drawing illustrating a first seal and a second seal formed on a first substrate according to Embodiment 1.

In step S12, UV-curable resin is coated on the surface 22a of the first substrate 22 using a dispenser, thus forming the first seal 32 that seals the liquid crystal 26. Note that the UV-curable resin includes a spacer in order to maintain a cell gap. Next, in step S14, using a dispenser, an UV-releasable type adhesive is coated on the surface 22a of the first substrate 22 on which the first seal 32 is formed, thus forming the second seal 34 that surrounds the periphery of the first seal 32. As a result, the first seal 32 and the second seal 34 are formed on the first substrate 22 as illustrated in FIG. 4.

Figure 5:
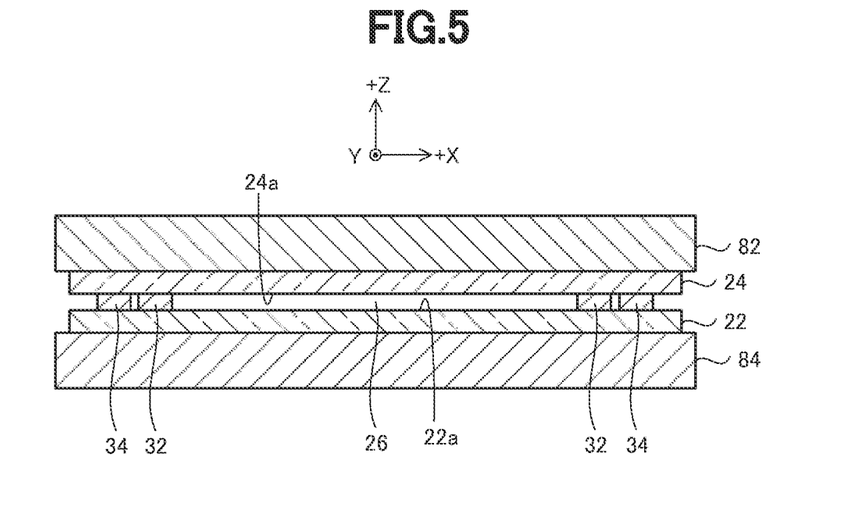
FIG. 5 is a schematic drawing illustrating the first substrate and the second substrate according to Embodiment 1, stacked in a flat state.

Returning to FIG. 3, in step S16, the liquid crystal 26 is dropped in the region of surface 22a of the first substrate 22 surrounded by the first seal 32. Then, in step S18, as illustrated in FIG. 5, a heated upper surface plate 82 and a lower surface plate 84 are used to stack, in a flat state, the second substrate 24 on the first substrate 22 on which the liquid crystal 26 is dropped.

Returning to FIG. 3, in step S20, the second seal 34 is cured, thereby adhering the first substrate 22 and the second substrate 24, that are in a flat state, to each other. Accordingly, the second seal 34 is cured in a state in which the first substrate 22 and the second substrate 24 are flat.

Figure 6:
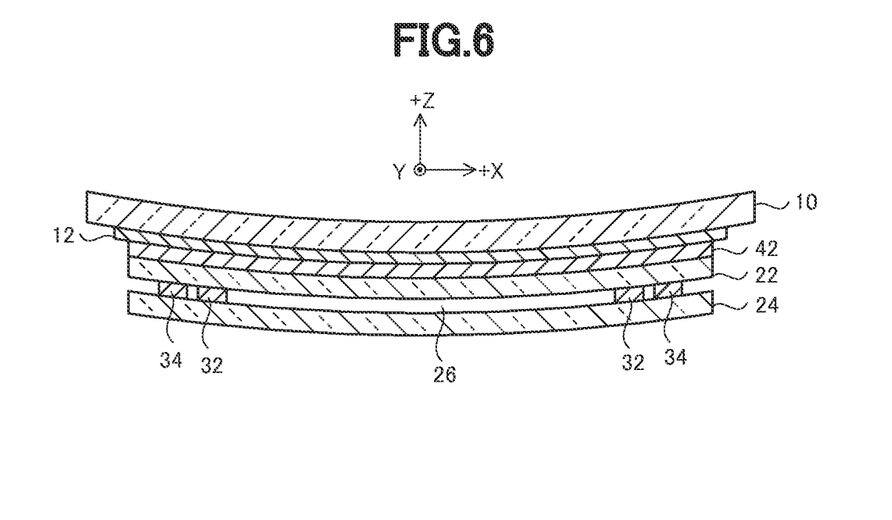
FIG. 6 is a schematic drawing illustrating the first substrate and the second substrate according to Embodiment 1, in a curved state.

Next, in step S22, the first polarizing plate 42 is adhered to the surface 22b of the first substrate 22. Then, in step S24, the first polarizing plate 42 is adhered to the first main surface 10a of the curved cover 10 via the adhesive layer 12, thereby curving, in the first direction (the –Z direction), the first substrate 22 and the second substrate 24 that are adhered to each other. As illustrated in FIG. 6, the first substrate 22 and the second substrate 24 that are adhered to each other curve in the –Z direction along the first main surface 10a of the curved cover 10.

Figure 7:
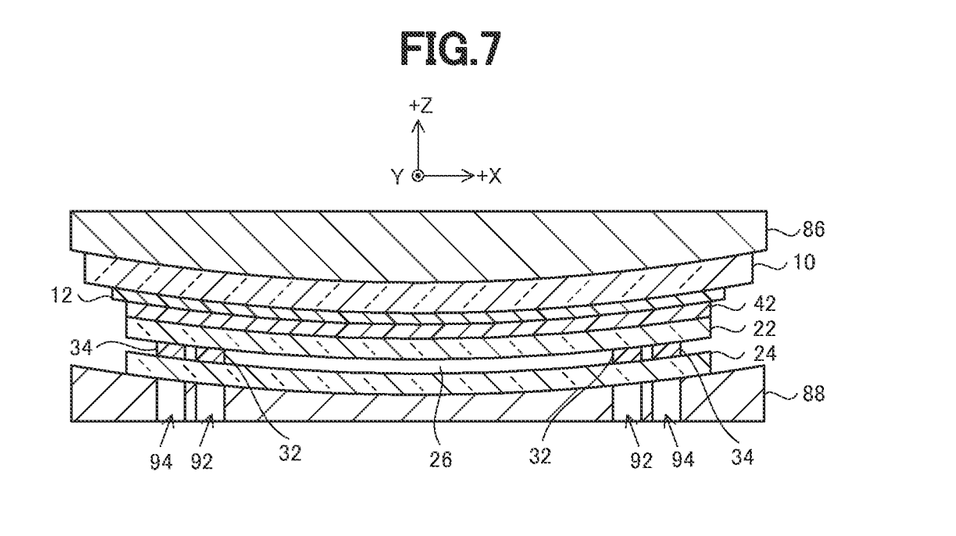
FIG. 7 is a schematic drawing illustrating a curved cover, the first substrate, and the second substrate according to Embodiment 1, pressed by an upper mold and a lower mold.

In step S26, firstly, as illustrated in FIG. 7, the curved cover 10, and the first substrate 22 and the second substrate 24 that are adhered to the curved cover 10, are pressed using an upper mold 86 and a lower mold 88, and the curved state of the first substrate 22 and the second substrate 24 is maintained. Here, openings 92, 94 are provided in the lower mold 88 in order to irradiate UV light on the first seal 32 and the second seal 34. Additionally, the curved cover 10 that contacts the upper mold 86 and the second substrate 24 that contacts the lower mold 88 are adsorbed onto the respective molds.

Next, the adhering force of the cured second seal 34 is weakened by irradiating the UV light on the cured second seal 34 through the opening 94. In this case, the weakened adhering force of the second seal 34 is made weaker than the adhering force of the cured first seal 32. In the present embodiment, since the second seal 34 is formed from a UV-releasable type adhesive, the second seal 34 releases from the first substrate 22 and the second substrate 24 due to the irradiation by the UV light.

In the present embodiment, the adhering force of the second seal 34, that is cured in the state in which the first substrate 22 and the second substrate 24 are flat, is weakened and, as such, the stress that is applied to the curved first substrate 22 and second substrate 24 can be suppressed.

Returning to FIG. 3, in step S28, the UV light is irradiated on the first seal 32 through the opening 92, thereby curing the first seal 32 in a state in which the first substrate 22 and the second substrate 24 are curved. As a result, the shear stress caused by the curving of the first substrate 22 and the second substrate 24 can be suppressed from acting on the first seal 32. Furthermore, deterioration of the first seal 32 can be suppressed, and the entering of air bubbles from outside into the liquid crystal 26, which is caused by the weakening of the adhesive strength of the first seal 32, can be suppressed.

In step S30, the curved cover 10 and the second substrate 24 are respectively removed from the upper mold 86 and the lower mold 88 and, then, the second polarizing plate 44 is adhered to the surface 24b of the second substrate 24. Thus, the curved liquid crystal panel 100 can be manufactured.

As described above, the adhering force of the second seal 34, that is cured in the state in which the first substrate 22 and the second substrate 24 are flat is made weaker than the adhering force of the first seal 32, that is cured in the state in which the first substrate 22 and the second substrate 24 are curved. As such, the shear stress caused by the curving of the first substrate 22 and the second substrate 24 can be suppressed from acting on the first seal 32. Additionally, stress that acts on the curved first substrate 22 and second substrate 24 can be suppressed.

Embodiment 2

In Embodiment 1, the second seal 34 has a frame-like shape. The second seal 34 may have any shape. It is sufficient that the second seal 34 maintains the state of the first substrate 22 and the second substrate 24 being adhered to each other until the first substrate 22 and the second substrate 24 are curved.

Figure 8:
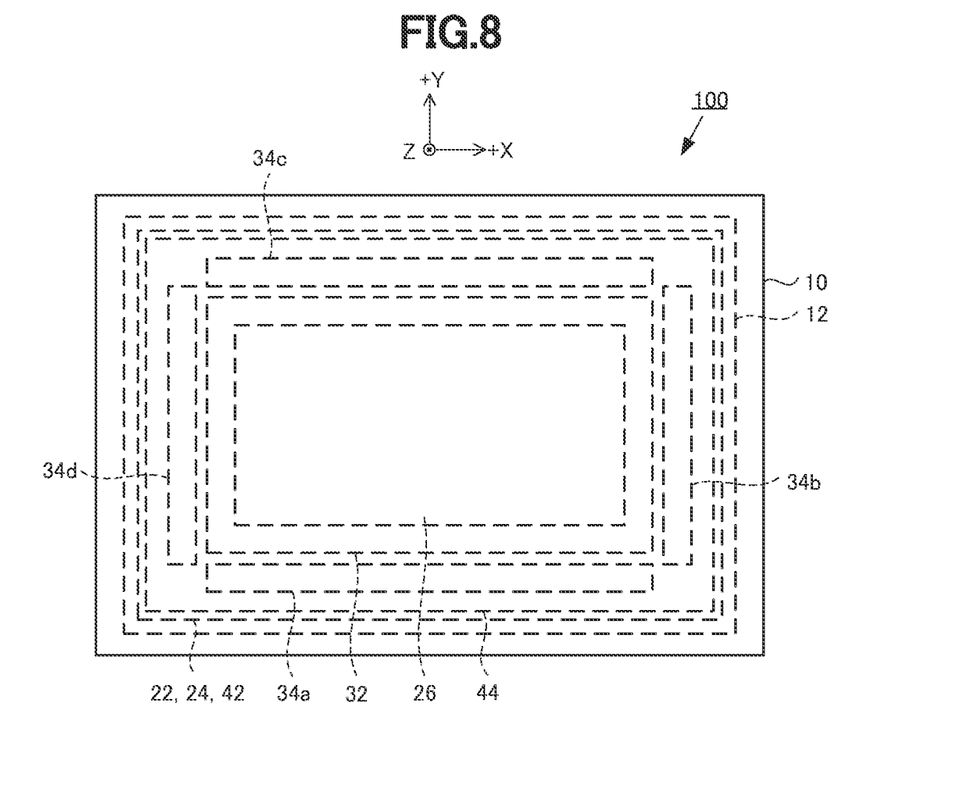
FIG. 8 is a plan view of a curved liquid crystal panel according to Embodiment 2.

As illustrated in FIG. 8, the curved liquid crystal panel 100 of the present embodiment includes a plurality of divided second seals 34a to 34d. Each of the second seals 34a to 34d is formed in a rectangular shape. The second seals 34a to 34d are arranged on the periphery of the first seal 32, surrounding the first seal 32. The other configurations of the curved liquid crystal panel 100 of the present embodiment are the same as the configurations of the curved liquid crystal panel 100 of Embodiment 1.

As with the curved liquid crystal panel 100 of Embodiment 1, in the curved liquid crystal panel 100 of the present embodiment, the adhering force of the second seal 34 is made weaker than the adhering force of the first seal 32 and, as such, the shear stress caused by the curving of the first substrate 22 and the second substrate 24 can be suppressed from acting on the first seal 32. Additionally, stress that acts on the curved first substrate 22 and second substrate 24 can be suppressed.

Embodiment 3

In Embodiment 1 and Embodiment 2, the curved liquid crystal panel 100 includes the first seal 32 and the second seal 34. However, a configuration is possible in which the curved liquid crystal panel 100 includes another seal.

Figure 9:
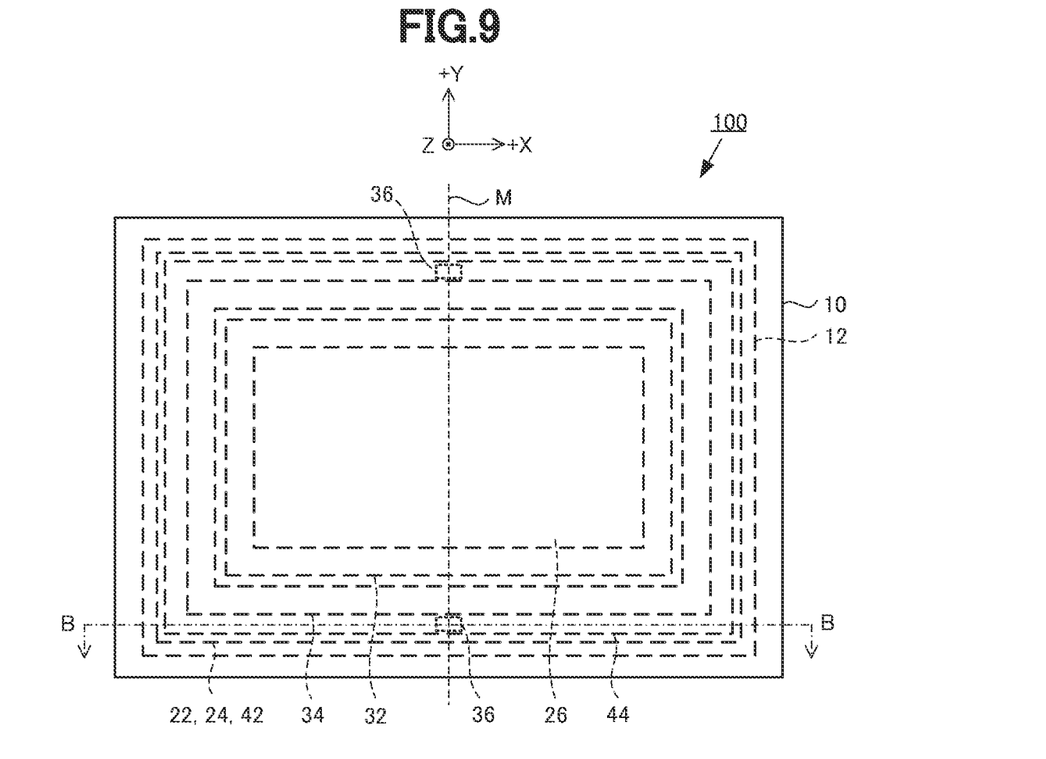
FIG. 9 is a plan view of a curved liquid crystal panel according to Embodiment 3.
Figure 10:
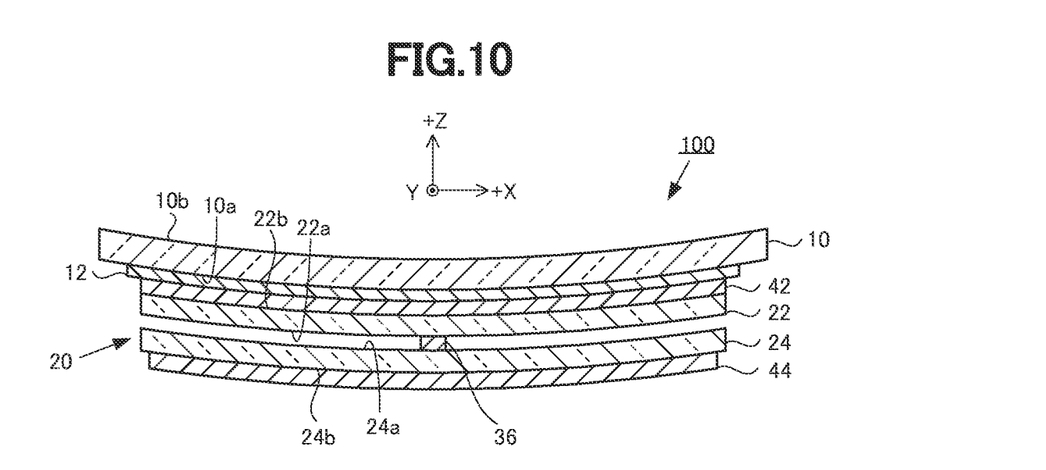
FIG. 10 is a cross-sectional view of the curved liquid crystal panel illustrated in FIG. 9, taken along line B-B.

The curved liquid crystal panel 100 of the present embodiment includes a third seal 36. The other configurations of the curved liquid crystal panel 100 of the present embodiment are the same as the configurations of the curved liquid crystal panel 100 of Embodiment 1.

The third seal 36 adheres the first substrate 22 and the second substrate 24 to each other. As illustrated in FIGS. 9 and 10, when viewed from above, the third seal 36 is positioned on a ridge line M of the curve of the first substrate 22 or the second substrate 24, and is disposed outside of the second seal 34. In the present embodiment, the third seal 36 is disposed at a position ½ the length of the curved side of the second seal 34. Due to this configuration, the first substrate 22 and the second substrate 24 can be curved without being obstructed by the third seal 36. It is preferable that the adhering force of the third seal 36 is stronger than the adhering force of the first seal 32. It is desirable that an adhesive that does not have disassemblable properties (an adhesive that is not a disassemblable adhesive), or an adhesive that does not require the same process as the chemical reaction process related to the curing of the first seal 32, is selected as the adhesive that forms the third seal 36. For example, a heat-curable epoxy resin, a solvent volatilization type rubber glue, a curing agent mixing-type two-component mixed epoxy resin, a heat-melt type styrene-butadiene rubber, a pressure-sensitive acrylic resin, or the like can be used as the third seal 36.

Forming of the third seal 36 is carried out between the preparing of the first substrate 22 and the second substrate 24 (step S10) and the stacking of the second substrate 24 on the first substrate 22 (step S18) in the manufacturing method for the curved liquid crystal panel 100 of Embodiment 1. The third seal 36 is cured before the curving of the first substrate 22 and the second substrate 24 in the −Z direction (step S24).

In the present embodiment, since the third seal 36 that is positioned on the ridge line M of the curve adheres the first substrate 22 and the second substrate 24 to each other before the first substrate 22 and the second substrate 24 are curved, positional deviation between the first substrate 22 and the second substrate 24 due to the curving can be suppressed. Additionally, as in Embodiment 1, the shear stress caused by the curving of the first substrate 22 and the second substrate 24 can be suppressed from acting on the first seal 32.

Modified Examples

Embodiments have been described, but various modifications can be made to the present disclosure without departing from the spirit and scope of the present disclosure.

The liquid crystal panel 20 of Embodiment 1 is a transmissive liquid crystal display panel, but a configuration is possible in which the liquid crystal panel 20 is a reflective liquid panel. Additionally, the liquid crystal panel 20 in Embodiment 1 operates in TN mode, but a configuration is possible in which the liquid crystal panel 20 operates in vertical alignment (VA) mode, fringe field switching (FFS) mode, or the like. Furthermore, the liquid crystal panel 20 of Embodiment 1 is curved in the −Z direction, but a configuration is possible in which the liquid crystal panel 20 is curved in the +Z direction.

The liquid crystal panel 20 of Embodiment 1 is curved by being adhered to the curved cover 10. A configuration is possible in which the liquid crystal panel 20 is curved by being pressed against the curved cover 10. Additionally, a configuration is possible in which the liquid crystal panel 20 is curved by being fitted into a curved frame-like chassis.

In Embodiment 1, the first substrate 22 includes a color filter, electrodes, an alignment film, and the like, and the second substrate 24 includes a TFT, wirings, electrodes, an alignment film, and the like. However, a configuration is possible in which the first substrate 22 includes a TFT, wirings, electrodes, an alignment film, and the like, and the second substrate 24 includes a color filter, electrodes, an alignment film, and the like. Additionally, a configuration is possible in which the first substrate 22 and the second substrate 24 are formed from a light transmitting resin.

In Embodiment 1, there is a spacing between the first seal 32 and the second seal 34, but a configuration is possible in which the first seal 32 and the second seal 34 contact each other. Additionally, the material of the second seal 34 is not limited to the disassemblable adhesive. It is sufficient that the second seal 34 maintains the state in which the first substrate 22 and the second substrate 24 are adhered to each other until the first substrate 22 and the second substrate 24 become curved, and that the adhering force of the second seal 34 is weaker than the adhering force of the first seal 32.

A configuration is possible in which the curved liquid crystal panel 100 of Embodiment 2 includes the third seal 36 of Embodiment 3.

In the manufacturing method for the curved liquid crystal panel 100 of Embodiment 1, the first seal 32 and the second seal 34 are formed on the first substrate 22, but a configuration is possible in which the first seal 32 and the second seal 34 are formed on the second substrate 24. Additionally, the first seal 32 is cured after the adhering force of the second seal 34 is weakened, but a configuration is possible in which the adhering force of the second seal 34 is weakened after the first seal 32 is cured.

In the manufacturing method for the curved liquid crystal panel 100 of Embodiment 1, the liquid crystal 26 is dropped after the second seal 34 is formed, but it is sufficient that liquid crystal 26 is dropped after the first seal 32 is formed and before the second substrate 24 is stacked on the first substrate 22.

Furthermore, a configuration is possible in which the liquid crystal 26 is sealed, by injection, in the region surrounded by the first seal 32. In such a case, the first seal 32 is formed with an injection port opened, the liquid crystal 26 is injected into the region surrounded by the first seal 32 and, then, the injection port of the first seal 32 is sealed. It is sufficient that the step of injecting and sealing the liquid crystal 26 in the region surrounded by the first seal 32 is executed after the adhering the first substrate 22 and the second substrate 24 to each other and before the curving the first substrate 22 and the second substrate 24.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A curved liquid crystal panel comprising:
   a first substrate curved in a first direction;
   a second substrate curved in the first direction and facing the first substrate;
   a liquid crystal sandwiched between the first substrate and the second substrate;
   a first seal that adheres the first substrate and the second substrate to each other, and that seals the liquid crystal; and
   a second seal surrounding a periphery of the first seal, wherein
   a force of the second seal adhering the first substrate and the second substrate to each other is weaker than a force of the first seal adhering the first substrate and the second substrate to each other, due to the second seal being in any one of a releasing state, a softening state, a liquefaction state, and breaking state.

2. The curved liquid crystal panel according to claim 1, wherein the second seal is divided into a plurality of sections.

3. The curved liquid crystal panel according to claim 1, wherein the second seal is formed from a disassemblable adhesive.

4. The curved liquid crystal panel according to claim 1, wherein the first seal is cured in a state in which the first substrate and the second substrate are curved in the first direction.

5. The curved liquid crystal panel according to claim 1, further comprising:
   a third seal that, when viewed from above, is disposed on a ridge line of a curve of the first substrate or the second substrate and outside the second seal, and that adheres the first substrate and the second substrate to each other.

6. A manufacturing method for a curved liquid crystal panel, the manufacturing method comprising:
   forming, on a first substrate or a second substrate, a first seal that seals a liquid crystal;
   forming, on one of the first substrate and the second substrate on which the first seal is formed, a second seal surrounding a periphery of the first seal;
   stacking one of the first substrate and the second substrate on which the first seal and the second seal are formed on another of the first substrate and the second substrate;
   curing the second seal and adhering the first substrate and the second substrate to each other;
   curving, in a first direction, the first substrate and the second substrate that are adhered to each other;
   weakening a force of the second seal adhering the first substrate and the second substrate to each other in a state in which the first substrate and the second substrate are curved; and
   curing the first seal in the state in which the first substrate and the second substrate are curved, wherein
   the weakened force of the second seal adhering the first substrate and the second substrate to each other is weaker than a force of the cured first seal adhering the first substrate and the second substrate to each other.

7. The manufacturing method for a curved liquid crystal panel according to claim 6, further comprising:
   dropping the liquid crystal in a region surrounded by the first seal, between the forming of the first seal and the stacking.

8. The manufacturing method for a curved liquid crystal panel according to claim 6, further comprising:
   injecting and sealing the liquid crystal in a region surrounded by the first seal, between the adhering and the curving.

* * * * *